(12) United States Patent
Nowak et al.

(10) Patent No.: US 9,128,204 B2
(45) Date of Patent: Sep. 8, 2015

(54) SHAPE-BASED METRICS IN RESERVOIR CHARACTERIZATION

(75) Inventors: Ethan J. Nowak, Cypress, TX (US); Matthias Imhof, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 771 days.

(21) Appl. No.: 13/428,938

(22) Filed: Mar. 23, 2012

(65) Prior Publication Data

US 2012/0261135 A1     Oct. 18, 2012

Related U.S. Application Data

(60) Provisional application No. 61/476,090, filed on Apr. 15, 2011.

(51) Int. Cl.
*G01V 1/00* (2006.01)
*G01V 1/30* (2006.01)

(52) U.S. Cl.
CPC ..................... *G01V 1/301* (2013.01)

(58) Field of Classification Search
None
See application file for complete search history.

(56) References Cited

U.S. PATENT DOCUMENTS

| | | | |
|---|---|---|---|
| 6,278,949 B1 | 8/2001 | Alam | |
| 6,438,493 B1 | 8/2002 | West et al. | |
| 6,560,540 B2 | 5/2003 | West et al. | |
| 6,631,202 B2 | 10/2003 | Hale | |
| 6,757,217 B2 | 6/2004 | Eastwood et al. | |
| 7,024,021 B2 | 4/2006 | Dunn et al. | |
| 7,248,539 B2 | 7/2007 | Borgos et al. | |
| 7,817,817 B2* | 10/2010 | Wu et al. | 382/100 |
| 2007/0036434 A1 | 2/2007 | Saveliev | |
| 2008/0037843 A1 | 2/2008 | Fu et al. | |
| 2008/0140319 A1 | 6/2008 | Monsen et al. | |
| 2008/0170756 A1 | 7/2008 | Beucher et al. | |
| 2008/0243749 A1 | 10/2008 | Pepper et al. | |
| 2010/0149917 A1* | 6/2010 | Imhof et al. | 367/53 |
| 2010/0161232 A1 | 6/2010 | Chen et al. | |
| 2011/0002194 A1* | 1/2011 | Imhof et al. | 367/53 |
| 2011/0048731 A1 | 3/2011 | Imhof et al. | |

FOREIGN PATENT DOCUMENTS

| | | |
|---|---|---|
| GB | 2 458 571 | 9/2009 |
| WO | WO 2009/082563 | 7/2009 |

(Continued)

OTHER PUBLICATIONS

Alt, H. et al. (2010), "Can We Compute the Similarity Between Surfaces?," *Discrete and Computational Geometry* 43(1), pp. 78-99.

(Continued)

*Primary Examiner* — Aditya Bhat
(74) *Attorney, Agent, or Firm* — ExxonMobil Upstream Research Co., Law Dept.

(57) ABSTRACT

Method for the segmentation and classification of seismic or other geophysical data. Curves or surfaces are identified in the geophysical data (10), then pairs of the curves or surfaces (12) are matched up according to a selected measure of shape similarity (13) such as the Hausdorff distance between members of a pair. The matched curves or surfaces (15) are used to define geobodies or faults in the geophysical data volume (16). The same inventive concept may also be used to warp/align (register) two different data volumes (72).

15 Claims, 5 Drawing Sheets

(56) References Cited

FOREIGN PATENT DOCUMENTS

| WO | WO 2009/126951 | 10/2009 |
| WO | WO 2009/142872 | 11/2009 |

OTHER PUBLICATIONS

Bronstein, A.M. et al. (2006), "Efficient Computation of Isometry-Invarient Distances Between Surfaces," *SIAM J. Sci. Comput.* 28(5), pp. 1812-1836.

Faucon, T. et al. (2005), "Morphological Segmentation Applied to 3D Seismic Data," *Mathemtical Morphology: 40 Years on, Computational Imaging and Vision* 30, pp. 475-484.

Fernandez, et al. (2000), "Texture Segmentation of a 3D Seismic Section with Wavelet Transform and Gabor Filters," $15^{th}$ Int'l. Conf. on Pattern Recognition, pp. 354-357.

Hale, D. et al. (2002), "Atomic meshing of seismic images," SEG Int'l. Exposition and $72^{nd}$ Annual Meeting, 4 pgs.

Hale, D. et al. (2003), "Seismic interpretation using global image segmentation," *SEG Expanded Abstracts* 22, pp. 2410-2413.

Kadlac, B.J. et al. (2008), "Confidence and Curvature-Guided Level Sets for Channel Segmentation," *Geophysics* 72, pp. 879-883.

Lomask, J. et al. (2007), "Application of Image Segmentation to Tracking 3D Salt Boundaries," *Geophysics* 72, pp. P47-P56.

Monsen, E. et al. (2005), "Multi-scale volume model building," *SEG Expanded Abstracts* 24, pp. 798-801.

Monsen, E. et al. (2002), "Segmentation of Seismic Data with Complex Stratigraphy Using Watershedding—Preliminary Results," IEEE $10^{th}$ Digital Signal Processing Workshop and the $2^{nd}$ Signal Processing Education Workshop, pp. ???

Patel, D.et al. (2008), "The Seismic Analyzer: Interpreting and Illustrating 2D Seismic Data," *IEEE Transactions on Visualization and Computer Graphics* 14(6), pp. 1571-1578.

Pitas, I. et al. (1989), "Texture Analysis and Segmentation of Seismic Images," Int'l. Conf. on Acoustics, Speech and Signal Processing, pp. 1437-1440.

Simaan, M.A. (1991), "Knowledge-Based Computer System for Segmentation of Seismic Sections Based on Texture," *SEG Expanded Abstracts* 10, pp. 288-292.

Valet, L. et al. (2001), "Seismic Image Segmentation by Fuzzy Fusion of Attributes," *IEEE Transactions on Instrumentation and Measurement* 50(4), pp. 1014-1018.

Zhu, B. (2007), "Protein Local Structure Alignment Under the Discrete Fréchet Distance," *J. of Computational Biology* 14(10), pp. 1342-1351.

\* cited by examiner

| Moment/Shape | 20 | 11 | 02 | 30 | 21 | 12 | 03 | 40 | 31 | 22 | 13 | 40 |
|---|---|---|---|---|---|---|---|---|---|---|---|---|
| ⌐⌙ | + | - | ++ | 0 | 0 | 0 | 0 | + | - | + | - | ++ |
| ⌒ | ... | ... | ... | ... | ... | ... | ... | ... | ... | ... | ... | ... |
| ╱ | + | - | + | 0 | 0 | 0 | 0 | + | - | + | - | + |
| ⌠ | ... | ... | ... | ... | ... | ... | ... | ... | ... | ... | ... | ... |
| ⌐| | ++ | - | + | 0 | 0 | 0 | 0 | ++ | - | + | - | + |
| ¬| | ++ | + | + | 0 | 0 | 0 | 0 | ++ | + | + | + | + |
| ⌒ | ... | ... | ... | ... | ... | ... | ... | ... | ... | ... | ... | ... |
| ╲ | + | + | + | 0 | 0 | 0 | 0 | + | + | + | + | + |
| ⌡ | ... | ... | ... | ... | ... | ... | ... | ... | ... | ... | ... | ... |
| ⌊⌐ | + | + | ++ | 0 | 0 | 0 | 0 | + | + | + | + | ++ |

*FIG. 6*

SHAPE-BASED METRICS IN RESERVOIR CHARACTERIZATION

This application claims the benefit of U.S. Provisional Patent Application No. 61/476,090, filed Apr. 15, 2011, entitled SHAPE-BASED METRICS IN RESERVOIR CHARACTERIZATION, the entirety of which is incorporated by reference herein.

FIELD OF THE INVENTION

This invention relates generally to the field of geophysical prospecting, and more particularly to the analysis of geophysical data such as seismic data. Specifically, the invention discloses use of shape similarity metrics in the geophysical interpretation process to either increase the efficiency of the interpretation process or enhance the results. These metrics provide a means to segment geophysical data or interpretations for further analysis or use.

BACKGROUND OF THE INVENTION

Following is a partial list of published methods for reservoir characterization using different metrics.

U.S. Pat. No. 6,438,493 ("Method for Seismic Facies Interpretation Using Textural Analysis and Neural Networks") to West and May discloses a method for segmentation based on seismic texture classification. For a prescribed set of seismic facies in seismic data volume, textural attributes are calculated and used to train a probabilistic neural network. This neural network is then used to classify each voxel of the data, which in practice segments the data into the different classes.

Further, U.S. Pat. No. 6,560,540 ("Method for Mapping Seismic Attributes Using Neural Networks") to West and May disclose a method for classification of seismic data during the seismic facies mapping process.

U.S. Pat. No. 6,278,949 ("Method for Multi-Attribute Identification of Structure and Stratigraphy in a Volume of Seismic Data") to Alam discloses a method for the visual exploration of a seismic volume without horizon picking or editing, but that still displays all horizons with their stratigraphic features and lithologic variations. Seismic data are processed to generate multiple attributes at each event location with a specified phase of the seismic trace. Subsets of multiple attributes are then interactively selected, thresholded, and combined with a mathematical operator into a new volume displayed on a computer workstation. Manipulation of attribute volumes and operators allows the user to visually recognize bodies of potential hydrocarbon reservoirs.

U.S. Pat. No. 6,631,202 ("Method for Aligning a Lattice of Points in Response to Features in a Digital Image") to Hale discloses a method for generating a lattice of points that respect features such as surfaces or faults in a seismic data volume. Hale and Emanuel further disclosed methods ("Atomic Meshing of Seismic Images", SEG Expanded Abstracts 21, 2126-2129 (2002); and "Seismic interpretation using global image segmentation", SEG Expanded Abstracts 22, 2410-2413 (2003)), to segment a data volume by creation of a space-filling polyhedral mesh based on this lattice.

U.S. Pat. No. 7,024,021 ("Method for Performing Stratigraphically-Based Seed Detection in a 3D Seismic Data Volume") to Dunn and Czernuszenko discloses a method for performing a stratigraphically-based seed detection in a 3-D seismic data volume. The method honors the layered nature of the subsurface so that the resulting geobodies are stratigraphically reasonable. The method can either extract all geobodies that satisfy specified criteria or determine the size and shape of a specific geobody in a seismic data volume.

U.S. Pat. No. 7,248,539 ("Extrema Classification") to Borgos et al. discloses a method for the automated extraction of surface primitives from seismic data. The steps include construction of seismic surfaces through an extrema representation of a 3D seismic data; computation of waveform attributes near the extrema, and classification based on these attributes to extract surface pieces. Pieces are then combined into horizon interpretations, used for the definition of surfaces or the estimation of fault displacements.

U.S. Patent Application 2007/0036434 ("Topology-Based Method of Partition, Analysis, and Simplification of Dynamical Images and Its Applications") by Saveliey discloses a method for the topological analysis and decomposition of dynamical images through computation of homology groups to be used, for example, for image enhancement or pattern recognition. A dynamical image is an array of black-and-white images (or frames) of arbitrary dimension that are constructed from gray scale and color images, or video sequences. Each frame is partitioned into a collection of components that are linked to the ones in adjacent frames to record how they merge and split.

U.S. Patent Application 2008/0037843 ("Image Segmentation for DRR Generation and Image Registration") by Fu et al. discloses a method for enhancing the multi-dimensional registration with digitally reconstructed radiographs derived from segmented x-ray data.

U.S. Patent Application 2008/0140319 ("Processing of Stratigraphic Data") by Monsen et al. discloses a method of processing stratigraphic data, such as horizon surfaces, within a geological volume. The method assigns to each stratigraphic feature a relative geological age by construction of a graph structure which is used for interpretation.

U.S. Patent Application 2008/0170756 ("Method for Hierarchical Determination of Coherent Events in a Seismic Image") by Beucher et al. discloses a method for the determination of coherent events in a seismic image which employs a hierarchical segmentation based on the watershed algorithm to track coherent surfaces.

U.S. Patent Application 2008/0243749 ("System and Method for Multiple Volume Segmentation") by Petter et al. discloses a method for performing oilfield operations which co-renders a visually-melded scene from two different seismic datasets. The visually-melded scene comprises a visualized geobody that is used to adjust oilfield operations.

U.S. Patent Applications 2010/0149917, 2010/0161232, 2011/0002194, and 2011/0048731 ("Seismic Horizon Skeletonization") by Imhof et al. disclose a method that extracts all surfaces from a seismic volume simultaneously. The resulting seismic skeleton is stratigraphically and topologically consistent.

Pitas and Kotropoulos ("Texture Analysis and Segmentation of Seismic Images", International Conference on Acoustics, Speech, and Signal Processing, 1437-1440 (1989)) propose a method for the texture analysis and segmentation of geophysical data based on the detection of seismic horizons and the calculation of their attributes (e.g. length, average reflection strength, signature). These attributes represent the texture of the seismic image. The surfaces are clustered into classes according to these attributes. Each cluster represents a distinct texture characteristic of the seismic image. After this initial clustering, the points of each surface are used as seeds for segmentation where all pixels in the seismic image are clustered in those classes in accordance to their geometric proximity to the classified surfaces.

Simaan (e.g., "Knowledge-Based Computer System for Segmentation of Seismic Sections Based on Texture", SEG Expanded Abstracts 10, 289-292 (1991)) discloses a method for the segmentation of two-dimensional seismic sections based on the seismic texture and heuristic geologic rules.

Fernandez et al. ("Texture Segmentation of a 3D Seismic Section with Wavelet Transform and Gabor Filters", 15th International Conference on Pattern Recognition, 354-357 (2000)) describe a supervised segmentation (i.e., classification) of a 3D seismic section that is carried out using wavelet transforms. Attributes are computed on the wavelet expansion and on the wavelet-filtered signal, and used by a classifier to recognize and subsequently segment the seismic section. The filters are designed by optimizing the classification of geologically well understood zones. As a result of the segmentation, zones of different internal stratification are identified in the seismic section by comparison with the reference patterns extracted from the representative areas.

Valet et al. ("Seismic Image Segmentation by Fuzzy Fusion of Attributes", IEEE Transactions On Instrumentation And Measurement 50(4), 1014-1018 (2001)) present a method for seismic segmentation based on the fusion of different attributes by using a set of rules expressed by fuzzy theory. The attributes are based on the eigenvalues of the structure tensor and measure total energy and dip-steered discontinuity. The final result is segmentation into high-amplitude continuous layers, chaotic regions, and background.

Monsen and Ødegård disclose a method for the segmentation of seismic data in "Segmentation of Seismic Data with Complex Stratigraphy Using Watershedding—Preliminary Results" in the proceedings of IEEE 10th Digital Signal Processing Workshop, and the 2nd Signal Processing Education Workshop (2002). The seismic data are treated as a topographic map. All the minima in the relief are slowly flooded. When the water level from different floods merges, dams are built to stop the flood from spilling into different domains. The flooding is continued until all of the relief is covered. The ultimate segmentation is then given by the dams that have built. The problem with the watershed algorithm is its inherent tendency to over-segment due to small, local minima. Progressive removal of small minima yields a hierarchical multiresolution segmentation of nested segments.

Further, Monsen et al. ("Multi-scale volume model building", SEG Expanded Abstracts 24, 798-801 (2005)) disclose a method for automated hierarchical model building with the promise of multi-scale model consistency. No further details are disclosed, however.

Faucon et al. ("Morphological Segmentation Applied to 3D Seismic Data", in Mathematical Morphology: 40 Years On, Computational Imaging and Vision, Volume 30, 475-484 (2005)) present the results obtained by carrying out hierarchal segmentation on 3D seismic data. First, they performed a marker-based segmentation of a seismic amplitude cube constrained by a previously picked surface. Second, they applied a hierarchical segmentation to the same data without a priori information about surfaces.

Lomask et al. ("Application Of Image Segmentation To Tracking 3D Salt Boundaries", Geophysics 72, P47-56 (2007)) present a method to delineate salt from sediment using normalized cuts image segmentation that finds the boundaries between dissimilar regions of the data. The method calculates a weight connecting each pixel in the image to every other pixel within a local neighborhood. The weights are determined using a combination of instantaneous amplitude and instantaneous dip attributes. The weights for the entire date are used to segment the image via an eigenvector calculation.

Kadlec et al., ("Confidence and Curvature-Guided Level Sets for Channel Segmentation", SEG Expanded Abstracts 27, 879-883 (2008)) present a method for segmenting channel features from 3D seismic volumes based on the local structure tensor.

Patel et al., ("The Seismic Analyzer: Interpreting And Illustrating 2D Seismic Data", IEEE Transactions On Visualization And Computer Graphics 14(6), 1571-1578 (2008)) disclose a toolbox for the interpretation and illustration of two-dimensional seismic slices. The method precalculates the horizon structures in the seismic data and annotates them by applying illustrative rendering algorithms such as deformed texturing and line and texture transfer functions.

U.S. Pat. No. 6,757,217 ("Method for time-aligning multiple offset seismic data volumes") by Eastwood et al. discloses a method to time align multiple seismic data volumes based on the cross-correlation of the data volumes at a plurality of time shifts.

Bronstein, Alexander M et al., ("Efficient Computation of Isometry-Invarient Distances Between Surfaces", SIAM J. Sci. Comput. 28(5), 1812-1836 (2006)) describe an efficient computational framework for isometry-invariant comparison of smooth surfaces.

Zhu, Binhai, ("Protein Local Structure Alignment Under the Discrete Fréchet Distance," J. of Computational Biology 14(10), 1342-1351 (2007)) studies the complexity and algorithmic aspects of local protein structure alignment under the discrete Fréchet distance.

Alt, Helmut and Maike Buchin, ("Can We Compute the Similarity Between Surfaces?," Discrete and Computational Geometry 43(1) (2010)) provide an introduction and disclose the limitations of the Hausdorff distance metric and provide a computable characterization of the weak Fréchet distance in a geometric data structure called a free space diagram.

SUMMARY OF THE INVENTION

In one embodiment, the invention is a computer-implemented method for segmenting a 2-D or 3-D volume of geophysical data representing a subsurface region for interpretation of physical structure in the subsurface region, said method comprising identifying curves or surfaces in the geophysical data, then matching up pairs of the curves or surfaces according to a selected measure of shape similarity, then using the curves or surfaces to define geobodies or faults in the geophysical data volume, and interpreting the geobodies or faults to indicate physical structure of the subsurface region.

In another embodiment, the invention is a computer-implemented method for aligning two different geophysical data volumes representing the same subsurface region, comprising identifying curves or surfaces in each data volume, then selecting a pair of surfaces, one from each data volume, and testing them for similarity according to a selected of similarity, then repeating for a plurality of different pair combinations, then matching curves or surfaces in one data volume to corresponding curves and surfaces in the other data volume based on the distance measure of similarity and using the matched curves and surfaces to warp or align the two data volumes, then using the warped or lined data volumes for time-lapse seismology, multi-attribute studies, amplitude variation with offset (AVO) analysis, or other hydrocarbon analysis where features in one dataset need to be related to features in another dataset.

Some or all steps of the invention are performed using a computer.

BRIEF DESCRIPTION OF THE DRAWINGS

The present invention and its advantages will be better understood by referring to the following detailed description and the attached drawings in which:

FIG. 6 shows polarity of central moments for various shapes potentially related to stratigraphy.

Figure 1:
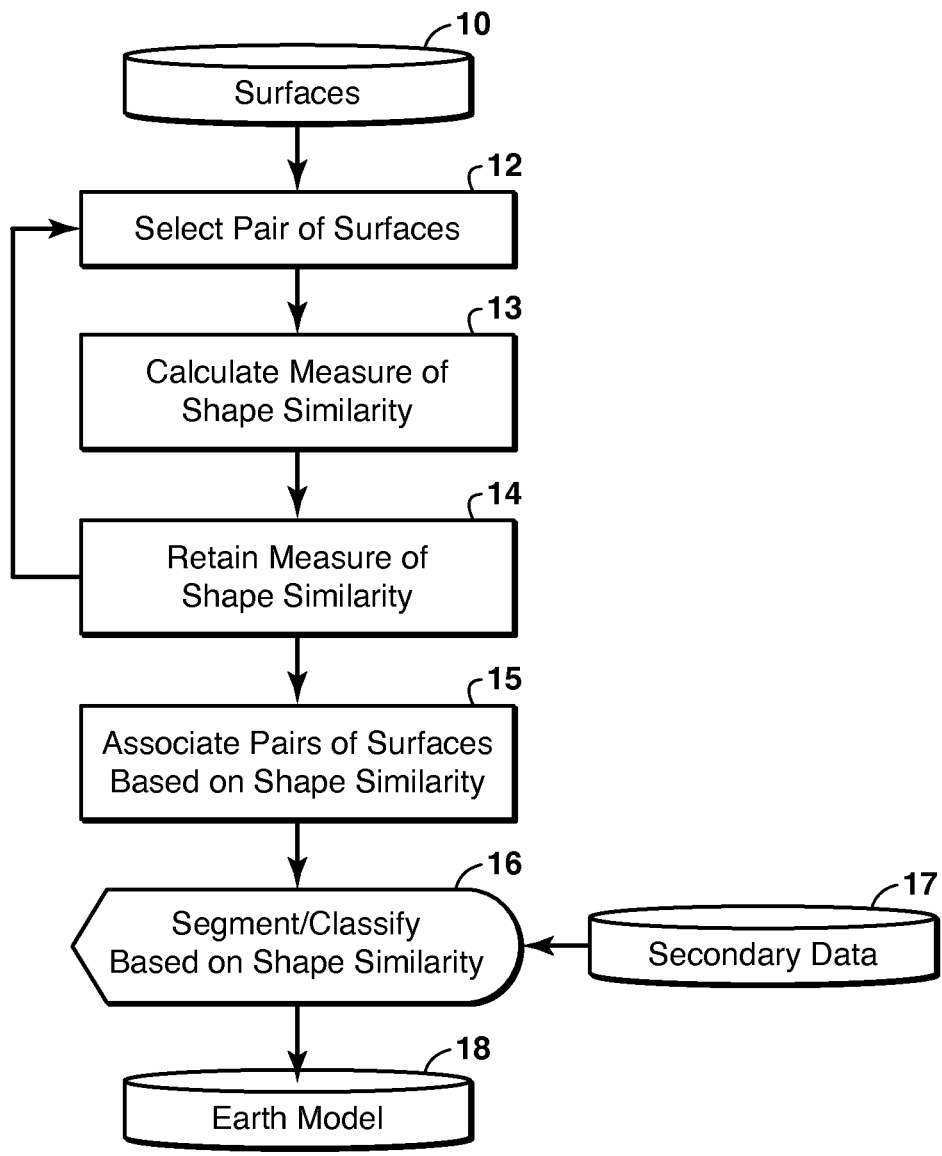
FIG. 1 is a chart showing basic steps in one embodiment of the present inventive method.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Geophysical interpreters and analysts continuously have access to more data and are confronted with accelerated deadlines. This invention describes the use of shape similarity metrics, which are shown to automate and/or increase the efficiency of interpretation processes. These efficiencies are realized in a variety ways; for example segmentation into geobodies, low frequency model building, defining fault planes from fault sticks, spatial and/or temporal alignment of data, to name just a few. Such an increase in efficiency can provide a competitive advantage in the exploration or production of hydrocarbons or other sought-after commodities.

In order to search for hydrocarbon accumulations in the earth, geoscientists use methods of remote sensing to look below the earth's surface. In the routinely used seismic reflection method, man-made sound waves are generated near the surface. The sound propagates into the earth, and whenever the sound passes from one rock layer into another, a small portion of the sound reflects back to the surface where it is recorded. Typically, hundreds to thousands of recording instruments are employed. Sound waves are sequentially excited at many different locations. From all these recordings, a two- or three-dimensional image of the subsurface may be obtained after significant data processing.

After processing the seismic data, geoscientists initiate the interpretation phase. One component of this phase is interpretion of reflection boundaries called horizons and/or reflection breaks called faults. This process can either be done manually or in an automatic fashion. Horizons or faults may be represented by random or regularly-spaced sample points (or samples) or by digitized lines called horizon traces or fault sticks. Traces and sticks are typically created within selected planes, for example digitized in every fiftieth inline, crossline or time slice. Alternatively, horizons or faults can be represented in a parametric form. Regardless of how the horizons or faults sticks are generated and represented, these interpretation objects and the associated data can be segmented and/or classified for further analysis. Because the inventive method can be used for classification or segmentation based on horizons or faults, the term surface is used for simplicity to denote a horizon, a fault, or elements thereof such as one trace or one stick. These classifications or segmentations can be used for reconnaissance sculpting of geophysical or geological anomalies, generation of a low frequency model for geophysical inversions, establishment of the sequence stratigraphic framework, or the formation of the structural framework.

FIG. 1 is a flowchart showing the basic steps in one embodiment of the present inventive method for the segmentation and classification of seismic data. At step 10, a population of interpreted or modeled seismic surfaces is obtained. At step 12, a pair of surfaces is selected from the population. At step 13, a similarity metric is chosen and evaluated to assess the similarity between the two selected surfaces. At step 14, this measure of similarity is then stored, and steps 12-14 are repeated for selected pairs of surfaces. In some preferred embodiments of the invention, similarity assessment is limited, for example to adjacent surfaces, or to overlapping surfaces, or to surfaces within a user specified search radius, or to surfaces that are collocated in two or more volumes. In an embodiment toward the other extreme, an exhaustive search can be chosen where every pair of surfaces is examined, i.e. if N surfaces are selected in step 10, then N(N−1)/2 pairs are measured for similarity. In step 15, surfaces are associated with each other based on their similarity measures. The association of surfaces may then used to aid in the search for hydrocarbons or in the production of hydrocarbons.

In a preferred embodiment of the invention, the association of surfaces is used in step 16 to segment, classify or relate secondary data 17, for example a seismic data volume. In a preferred embodiment, an inputted seismic data volume 17 is segmented by successive linkage of data voxels between the similar surfaces from step 16. The final result may be an earth model 18 that can be used to guide the visualization of data, construction of a low-frequency trend model used to regularize an inversion process, or the formation of an interpretational framework.

Figure 2A:
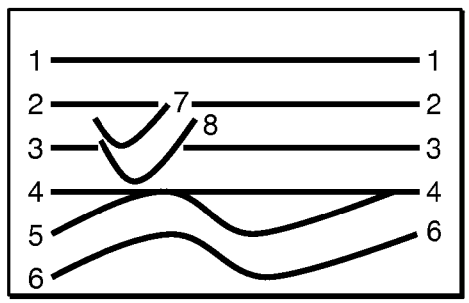
FIGS. 2A-2C illustrate (2A) eight surfaces, (2B) a classification based on surface shape and (2C) the formation of geobodies through the segmentation process.
Figure 2B:
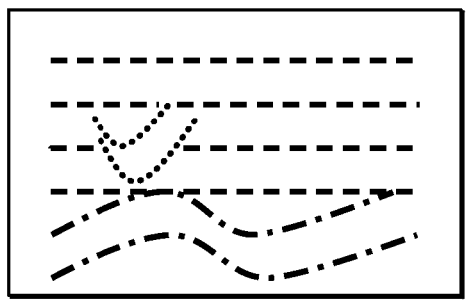
Figure 2C:
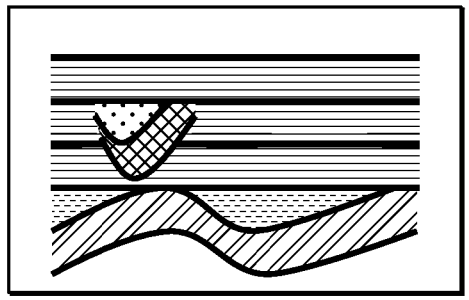

For the present inventive method, the choice of what process is used for generating and representing surfaces is irrelevant. Moreover, the kind of surface is irrelevant. In one preferred embodiment of the inventive method, the surfaces correspond to horizons that were either manually picked or automatically created and the objective is formation of segments or geobodies spanned by similar surfaces. This process is illustrated in FIGS. 2A-2C, where eight (8) horizons have been obtained, and based on their shape similarity and proximity:

1. Surfaces 1 and 2, 2 and 3, 3 and 4 all have similar shapes and are in close proximity to each other, hence the voxels between surfaces 1, 2, 3, and 4 likely make up the same geobody.
2. Surfaces 7 and 8 are also similar in shape, defining another likely geobody.

3. Surfaces 5 and 6, also being similar in shape define a third likely geobody.
4. Surfaces 2 and 7, and 4 and 5 are not similar in shapes, however the voxels between these surfaces need to be assigned, and hence are the fourth and fifth geobodies in this example.

Figure 3A:
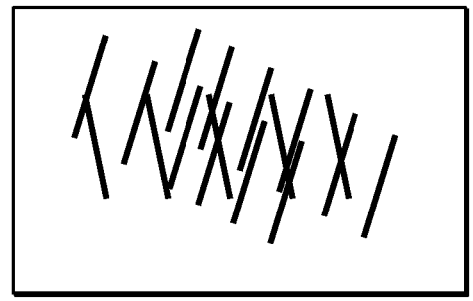
FIGS. 3A-3C illustrate (3A) 17 fault sticks, (3B) a classification based on shape, orientation and proximity, and (3C) the formation of three fault planes through the segmentation process.
Figure 3B:
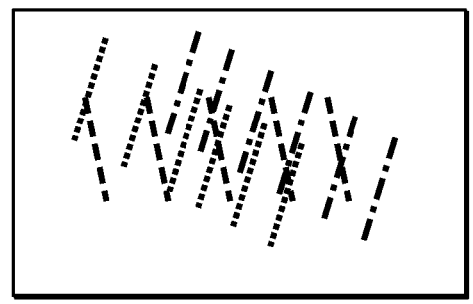
Figure 3C:
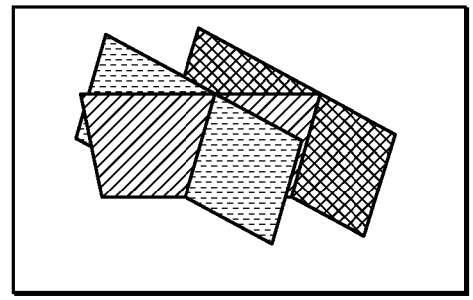

In another preferred embodiment, the surfaces correspond to individual fault sticks and the objective is sorting the fault sticks into separate faults. This process is illustrated in FIG. 3A-3C, where 17 individual fault sticks are obtained in FIG. 3A and classified in FIG. 3B based on shape, orientation and proximity. Based on this classification, the fault sticks, 17 in this example, are combined to form three (3) fault planes, shown in FIG. 3C, to aid in the seismic interpretation process.

Figure 5A:
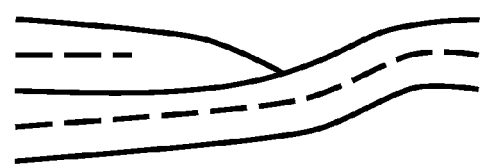
FIG. 5A-5C demonstrate reducing seismic data to simple horizons using an embodiment of the present inventive method.
Figure 5B:
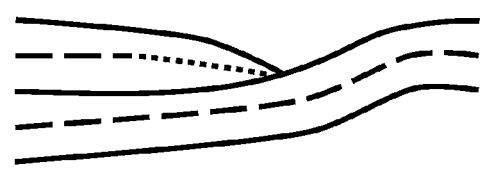
Figure 5C:
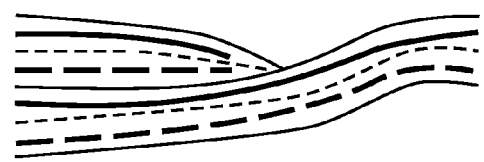

A particular embodiment of the invention for generating horizons or horizon traces involves reduction of the data to stick figures where all elements are either simple curves or surfaces. Curves or surfaces are broken apart at branch or merge points as illustrated in FIG. 5A to ensure that all elements are single valued. An efficient method of generating the stick figures is by blocking the seismic data based on polarity. Basically, every negative sample is set to −1, while every positive sample is set to +1. Morphological thinning may be used to reduce the blocks to single-voxel lines or surfaces. These surfaces, however, merge into each other and form complex, multi-valued structures. One solution is to remove the edges and joints where multiple surface patches meet. The result, however, are small surfaces that are difficult to distinguish. A preferred method of simplifying the stick figures is shown in FIGS. 5A-5C. Solid lines represent peaks or positive events, dashed lines represent troughs or negative events. Two peaks merge and form a complex surface that cuts off the sandwiched trough. In a first step (FIG. 5B), cut off surfaces are extended into the junction formed by the encasing surfaces. In a second step (FIG. 5C), new surfaces are drawn in between the lines or more specifically interpolated between the original or extended surfaces. FIG. 5C demonstrates that the interpolated surfaces exhibit the desired property of being large and distinguishable without forming complex structures, i.e. they form simple horizons.

There are a variety of similarity metrics that can be used in the present inventive method to assess the similarity of two surfaces or shapes. A preferred shape similarity metric for pairs of surfaces interpreted or extracted from the seismic data is the Hausdorff distance. For two surfaces A and B, this metric is defined by:

$$D_H = \max\left[\max_{a \in A} \min_{b \in B} \|a - b\|, \max_{b \in B} \min_{a \in A} \|a - b\|\right]$$

Here a and b are at least subsets of points located on the surfaces A and B. In the first stage the distance metric is calculated for a particular point on b to every point on a and the shortest distance is retained. This process repeats for every point on b until the distance between each point on b is measured to all points on a, all the while retaining the shortest distances between points on a and all points on b. Of all these shortest distances, only the longest one is retained. The second stage of the calculation reverses the roles of a and b to ensure symmetry. Now the distance metric is calculated for a particular point on a to each point on b and the shortest distance is retained. This process repeats until the distance between every point on a is measured to all points on b while retaining the shortest distances. Again, of all these shortest distances, only the longest one is retained. Finally, the Hausdorff distance is defined the longer of the two distances retained in stages one and two.

In the above equation ||...|| denotes the underlying p-norm distance between two points located in an n-dimensional space $$\|x\|_p := \left(\sum_{i=1}^{n} |x_i|^p\right)^{\frac{1}{p}}.$$

Examples include, but are not limited to the Manhattan norm (p=1), or Euclidean norm (p=2).

Another preferred similarity metric is Procrustes analysis that is based on the least-squares misfit between the two surfaces or shapes after normalization of origin, scale, and orientation. Other suitable similarity metrics between surfaces include, for example, the Fréchet distance, graph matching, isometry-invariant distances and all their variations. The similarity measures mentioned herein are examples only, and are not intended to be an exhaustive list of the similarity measures suitable for use in the present inventive method.

In some embodiments of the present invention, the surfaces belong to two (or more) different sets, and pairs of surfaces are formed by selecting one surface from each set. A preferred application for such an embodiment is volume alignment or registration. Registration is crucial in the areas of, for example, time-lapse seismology, multi-attribute studies, or amplitude variation with offset (AVO) analysis, where features in one dataset need to be related to features in another dataset. The volumes may differ, for example, in their time of seismic acquisition, in the acquisition geometry, in the seismic wave types, or in the data processing. Due to these differences, the same feature is located in different locations of the two volumes and direct comparison is suboptimal. In a preferred embodiment, features or surfaces in one dataset are compared against features or surfaces in the other dataset to identify the most likely correspondences based on their shape similarity.

Figure 4A:
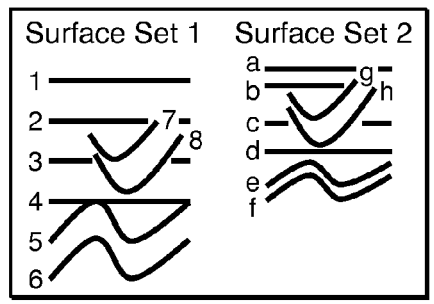
FIGS. 4A-4C illustrate (4A) two unaligned sets of surfaces, (4B) a classification based on shape between the two sets and (4C) the alignment of the two datasets.
Figure 4B:
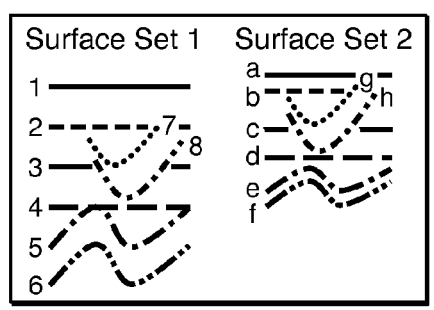
Figure 4C:
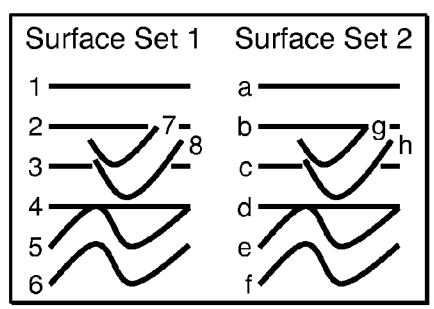
Figure 7:
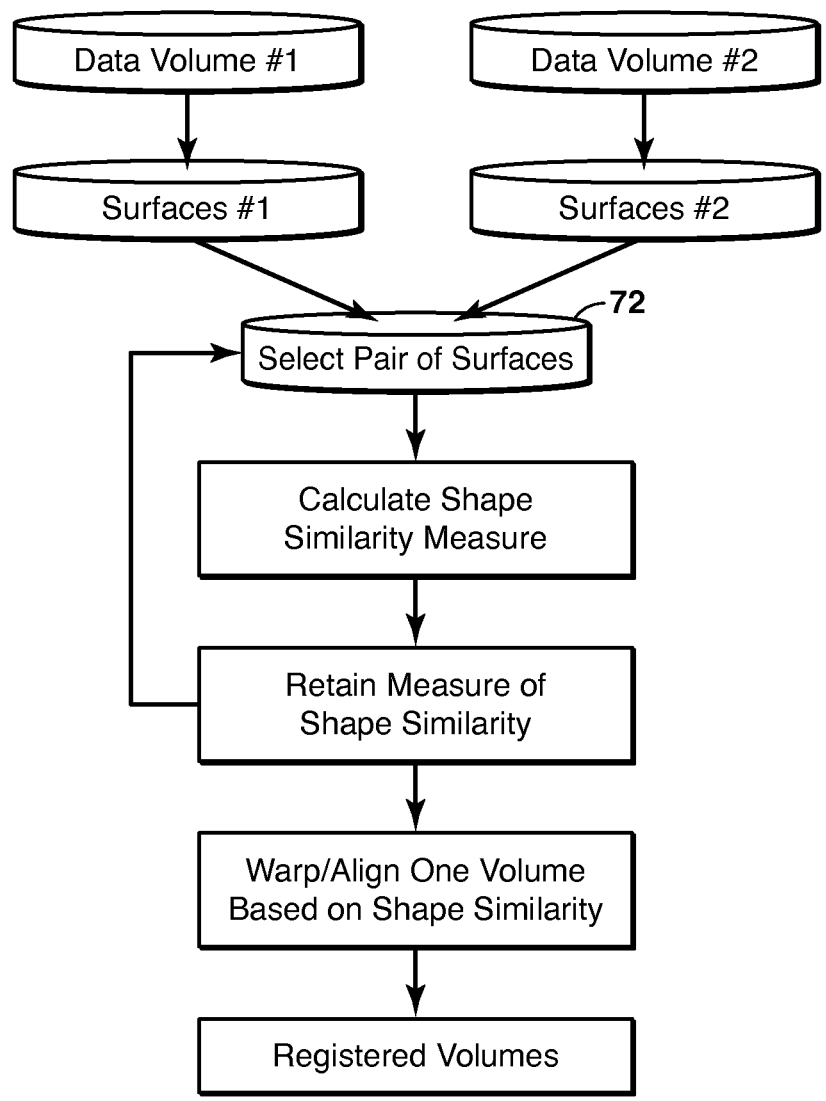
FIG. 7 is a flow chart showing basic steps in one embodiment where the present inventive method is used to register two data volumes.

The process initiates by obtaining surfaces on each seismic dataset. Now, instead of picking two surfaces from the same data set, we select one surface from each set (step 72 in the flowchart of FIG. 7) and calculate the similarity metric. Additional pairs of surfaces are selected until all pairs of surfaces have been compared. Then one volume is warped/aligned with that of the other for further analysis. This process is illustrated in FIGS. 4A-4C, where (see FIG. 4A) eight surfaces are obtained from two different data sets that are similar in character but not properly aligned. Based on the shape similarity between the surfaces obtained from the multiple datasets (see FIG. 4B), one volume can be properly aligned with the other (see FIG. 4C) for further analysis.

In a preferred embodiment of the inventive method, only the first set of surfaces is derived from the given seismic data. The second set of surfaces is taken from a database of surfaces that exemplify geologic conditions of interest to the current dataset, for example sigmoidal foresets in a deltaic environment. Instead of populating the database with real exemplary surfaces extracted from some dataset, the database may also be populated with conceptual model surfaces. These model surfaces may be concave, convex, planar, sigmoidal, and so on. In both cases, the seismic surfaces are compared against the specified shapes using, for example, the Hausdorff-based similarity measure or the Procrustes similarity measure to classify the given seismic surfaces by the examples or models. Optionally, the data volume is later segmented into regions that, for example, are classified similarly.

An efficient shortcut to computing a similarity measure for every pair of surfaces is to summarize the individual surface shapes using a set of measurements. The advantage is that in step 13 only the shape summaries need to be compared instead of directly comparing every pair of surfaces. For every surface, this shape summary needs to be computed only once. When using exemplary surfaces from a database, the shape summaries can be computed before entering the surface into the database. Instead of recalling surfaces from the database, only their shape summaries need to be recalled.

In some cases, these shape summaries can even be computed analytically when model surfaces are used. FIG. 6 presents an example where the model surfaces are planes, ramps, and sigmoids with various degrees of symmetry. These shapes of these model surfaces are summarized by their central moments $$M_{pq} = \sum_x \sum_y (x-\bar{x})^p (y-\bar{y})^q f(x, y),$$

where the summation is performed over the surface shapes. The parameter f is a weighting factor that may be unity, an indicator, or an attribute. The different models differ in their moments as demonstrated in FIG. 6. For example, the first column looks at the moment p=2, q=0, for different shapes with f=1. Unless the moment is zero, the polarity of each moment is indicated as positive or negative. An entry of '++' indicates that the moment is positive and very large compared to the other moments. An entry of '+' indicates that this moment is positive for the given model. An entry of '0' indicates that the moment is neglectable compared to the other moments. An entry of '--' indicates that the moment is negative and very large compared to the other moments. An entry of '-' indicates that this moment is negative for the given model. Lastly, an entry ' . . . ' indicates that this moment is not determined in a systematic manner. Of course, other moments that are invariant under scaling, translation, rotation, or affine transformations can be found in the literature. Such moments are presented here in only as examples of ways that different shapes can be summarized in the present invention.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer-implemented method for segmenting a 2-D or 3-D volume of geophysical data representing a subsurface region for interpretation of physical structure in the subsurface region, said method comprising:
identifying curves or surfaces in the geophysical data,
using a computer to match up pairs of the curves or surfaces according to a selected measure of shape similarity,
using the matched-up curves or surfaces to define geobodies or faults in the geophysical data volume,
interpreting the geobodies or faults to indicate physical structure of the subsurface region, and
using the interpreted physical structure to explore for or produce hydrocarbons.

2. The method of claim 1, wherein the curves or surfaces identified in the geophysical data comprise fault sticks, and fault sticks belonging to a same fault are matched up according to the selected measure of shape similarity.

3. The method of claim 1, wherein said selected measure of shape similarity is based on computing distances from points on one of the pair of curves or surfaces to points on the other of the pair of curves or surfaces.

4. The method of claim 3, wherein said selected measure of shape similarity is one of a group consisting of the Hausdorff distance, Procrustes analysis, the Fréchet distance, graph matching, and an isometry-invariant distance.

5. The method of claim 1, wherein the identifying curves or surfaces comprises breaking apart initial curves or surfaces at branch or merge points to ensure that all curves or surfaces are single valued.

6. The method of claim 1, wherein the geophysical data are seismic data and the identifying curves or surfaces comprises identifying seismic amplitude peaks and troughs, then refining by morphological thinning.

7. The method of claim 1, wherein said matching up pairs of the curves or surfaces according to a selected measure of shape similarity comprises selecting a plurality of pairs of the curves or surfaces, then testing each pair for similarity using the selected measure of shape similarity, keeping the pairs that match and rejecting the pairs that do not match.

8. The method of claim 7, wherein all possible pairs of curves or surfaces are tested for similarity.

9. The method of claim 1, wherein the selected measure of shape similarity comprises summarizing the shape of each curve or surface using a selected set of measurements.

10. The method of claim 9, wherein said selected set of measurements are computed moments of the curve or surface.

11. A method for producing hydrocarbons from a subsurface region, comprising:
performing a seismic survey of the subsurface region;
obtaining an interpretation of the subsurface region's physical structure, said interpretation being made by a method of claim 1;
using said interpretation to plan a well into the subsurface region; and
drilling the well and producing hydrocarbons from it.

12. A computer-implemented method for aligning two different geophysical data volumes representing the same subsurface region, comprising:
identifying curves or surfaces in each data volume,
selecting a pair of the curves or surfaces, one from each data volume, and using a computer to test them for similarity according to a selected measure of shape similarity,
repeating for a plurality of different pair combinations,
matching curves or surfaces in one data volume to corresponding curves and surfaces in the other data volume based on the selected measure of shape similarity,
using the matched curves and surfaces to warp or align the two data volumes,
using the warped or lined data volumes for time-lapse seismology, multi-attribute studies, amplitude variation with offset (AVO) analysis, or other hydrocarbon analysis where features in one dataset need to be related to features in another dataset in order to explore for or produce hydrocarbons.

13. The method of claim 12, wherein the two different geophysical data volumes are seismic data from two different surveys conducted at different times.

14. The method of claim 12, wherein the two different geophysical data volumes are a seismic data set and a set of surfaces taken from a database of surfaces that exemplify geologic conditions representative of the subsurface region.

15. A non-transitory computer usable medium having computer readable program code embodied therein, said computer readable program code adapted to be executed to implement a method for segmenting a 2-D or 3-D volume of geophysical data representing a subsurface region for interpretation of physical structure in the subsurface region, said method comprising:

identifying curves or surfaces in the geophysical data, matching up pairs of the curves or surfaces according to a selected measure of shape similarity, using the curves or surfaces to define geobodies or faults in the geophysical data volume, and outputting the geobodies or faults for interpretation of physical structure of the subsurface region in order to explore for or produce hydrocarbons.

* * * * *